(12) United States Patent
Kozuka (10) Patent No.: US 10,752,240 B2
(45) Date of Patent: Aug. 25, 2020

(54) DRIVING CONTROL DEVICE OF VEHICLE

(71) Applicant: TOYOTA JIDOSHA KABUSHIKI KAISHA, Toyota-shi, Aichi-ken (JP)

(72) Inventor: Tomoyuki Kozuka, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 15/713,119

(22) Filed: Sep. 22, 2017

(65) Prior Publication Data

US 2018/0105168 A1 Apr. 19, 2018

(30) Foreign Application Priority Data

Oct. 14, 2016 (JP) ................................. 2016-202581

(51) Int. Cl.
*B60W 30/09* (2012.01)
*B60T 7/12* (2006.01)
*B60T 8/88* (2006.01)
*B60T 8/17* (2006.01)

(52) U.S. Cl.
CPC ............. *B60W 30/09* (2013.01); *B60T 7/12* (2013.01); *B60T 8/17* (2013.01); *B60T 8/885* (2013.01); *B60T 2270/406* (2013.01)

(58) Field of Classification Search
CPC ................................ B60W 30/09; B60T 7/12
USPC ......................................................... 701/36
See application file for complete search history.

(56) References Cited

U.S. PATENT DOCUMENTS

| | | | |
|---|---|---|---|
| 6,131,063 A | 10/2000 | Seki et al. | |
| 2001/0037171 A1* | 11/2001 | Sato ........................ | B60T 8/00 |
| | | | 701/70 |
| 2003/0033073 A1 | 2/2003 | Kichima et al. | |
| 2007/0150118 A1* | 6/2007 | Takamatsu ........... | B60W 10/04 |
| | | | 701/1 |
| 2013/0311043 A1* | 11/2013 | Kobana ................. | B60W 30/00 |
| | | | 701/41 |
| 2014/0015663 A1* | 1/2014 | Uno ...................... | B60W 40/08 |
| | | | 340/439 |

(Continued)

FOREIGN PATENT DOCUMENTS

| | | |
|---|---|---|
| JP | H11-048952 A | 2/1999 |
| JP | 2000-057496 A | 2/2000 |
| JP | 2000-071807 A | 3/2000 |

(Continued)

*Primary Examiner* — Khoi H Tran
*Assistant Examiner* — Rodney P King
(74) *Attorney, Agent, or Firm* — Oliff PLC (57) ABSTRACT

A driving control device of a vehicle includes a brake device and an ECU. The brake device is configured to apply a braking force to wheels. The ECU is configured to perform driving support control by calculating target deceleration of the vehicle and controlling the brake device such that deceleration of the vehicle reaches the target deceleration, to stop the driving support control when the driving support control is unable to be performed normally, and to determine whether or not a driver is in an abnormal state. The ECU is configured to decelerate the vehicle by controlling the deceleration of the vehicle so as to reach a predetermined value or more, when the driving support control is unable to be performed normally due to factors other than abnormality of the braking device in a situation where a determination that the driver is in an abnormal state is made.

7 Claims, 7 Drawing Sheets

(56) References Cited

U.S. PATENT DOCUMENTS

2017/0158054 A1    6/2017  Munaoka et al.

FOREIGN PATENT DOCUMENTS

| JP | 2003-034240 A | 2/2003 |
| JP | 2012-111263 A | 6/2012 |
| JP | 2015-162005 A | 9/2015 |
| JP | 2016-045713 A | 4/2016 |
| JP | 2016-068703 A | 5/2016 |
| JP | 2016-085563 A | 5/2016 |

\* cited by examiner

FIG. 11

DRIVING CONTROL DEVICE OF VEHICLE

INCORPORATION BY REFERENCE

The disclosure of Japanese Patent Application No. 2016-202581 filed on Oct. 14, 2016 including the specification, drawings and abstract is incorporated herein by reference in its entirety.

BACKGROUND

1. Technical Field

The disclosure relates to a driving control device of a vehicle such as an automobile.

2. Description of Related Art

In a vehicle such as an automobile, a driving control device configured to perform driving support control by calculating target deceleration of the vehicle and controlling a braking device such that deceleration of the vehicle reaches the target deceleration is known. As the driving support control for controlling the deceleration of the vehicle, there are inter-vehicle distance control (preceding vehicle following control), collision prevention control, and the like, and for example, Japanese Unexamined Patent Application Publication No. 2000-71807 (JP 2000-71807 A) discloses an example of the inter-vehicle distance control.

A vehicle in which the driving support control for controlling the deceleration of the vehicle is performed is equipped with a detection device such as a radar sensor or a CCD camera, which acquires information in front of the vehicle, and the target deceleration of the vehicle is calculated based on the detection result by the detection device. When abnormality occurs in the detection device or a signal transmission path from the detection device to a control device, it is not possible to properly calculate the target deceleration of the vehicle, and therefore, the control of the deceleration of the vehicle by the driving support control is canceled and deceleration of the vehicle is entrusted to a driver.

Further, for example, as disclosed in Japanese Unexamined Patent Application Publication No. 2016-45713 (JP 2016-45713 A), in a vehicle such as an automobile, a driver abnormality determination device which determines whether or not abnormality in which a driver cannot perform normal driving due to loss of physical condition or the like during driving, has occurred, is known.

SUMMARY

In a vehicle in which driving support control is performed, even when a driver shows abnormality, the driving support control is executed, whereby it is possible to continue the traveling of the vehicle. However, when abnormality occurs in the driving support control in a situation where the driver is in an abnormal state, there is a possibility that the situation in which the control of the deceleration of the vehicle by the driving support control is canceled in a situation where the driver cannot normally decelerate the vehicle by a braking operation or the like may occur.

The disclosure provides a driving control device of a vehicle to decelerate, in a vehicle in which, when abnormality occurs in the driving support control, the control of the deceleration of the vehicle by the driving support control is canceled, the vehicle without depending on a braking operation by a driver in a case where abnormality occurs in the driving support control in a situation where the driver is in an abnormal state.

An aspect of the disclosure relates to a driving control device of a vehicle including a brake device and an electronic control unit. The brake device is configured to apply a braking force to wheels. The electronic control unit is configured to perform driving support control by calculating target deceleration of the vehicle and controlling the brake device such that deceleration of the vehicle reaches the target deceleration, configured to stop the driving support control when the driving support control is unable to be performed normally, and configured to determine whether or not a driver is in an abnormal state. The electronic control unit is configured to decelerate the vehicle by controlling the deceleration of the vehicle so as to reach a predetermined value or more, when the driving support control is unable to be performed normally due to factors other than abnormality of the braking device in a situation where a determination that the driver is in an abnormal state is made.

According to the aspect of the disclosure, when the driving support control cannot be performed normally due to factors other than abnormality of the brake device in a situation where a determination that the driver is in an abnormal state is made, the deceleration of the vehicle is controlled so as to reach a predetermined value or more, whereby the vehicle is decelerated. Accordingly, it is possible to prevent the deceleration of the vehicle from being stopped when the driving support control cannot be performed normally in a situation where the driver is in an abnormal state, and to reduce a vehicle speed without depending on the braking operation by the driver.

The "factors other than abnormality of the brake device" may be factors obstructing proper calculation of the target deceleration of the vehicle, like abnormality of an information acquisition device which acquires information needed for the calculation of the target deceleration of the vehicle, transmission abnormality of information from the information acquisition device to an electronic control unit, and the like. Further, the "abnormality of a driver" may be a situation in which the driver cannot properly perform a driving operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Several preferred embodiments of the disclosure will be described in detail with reference to the accompanying drawings.

First Embodiment

Figure 1:
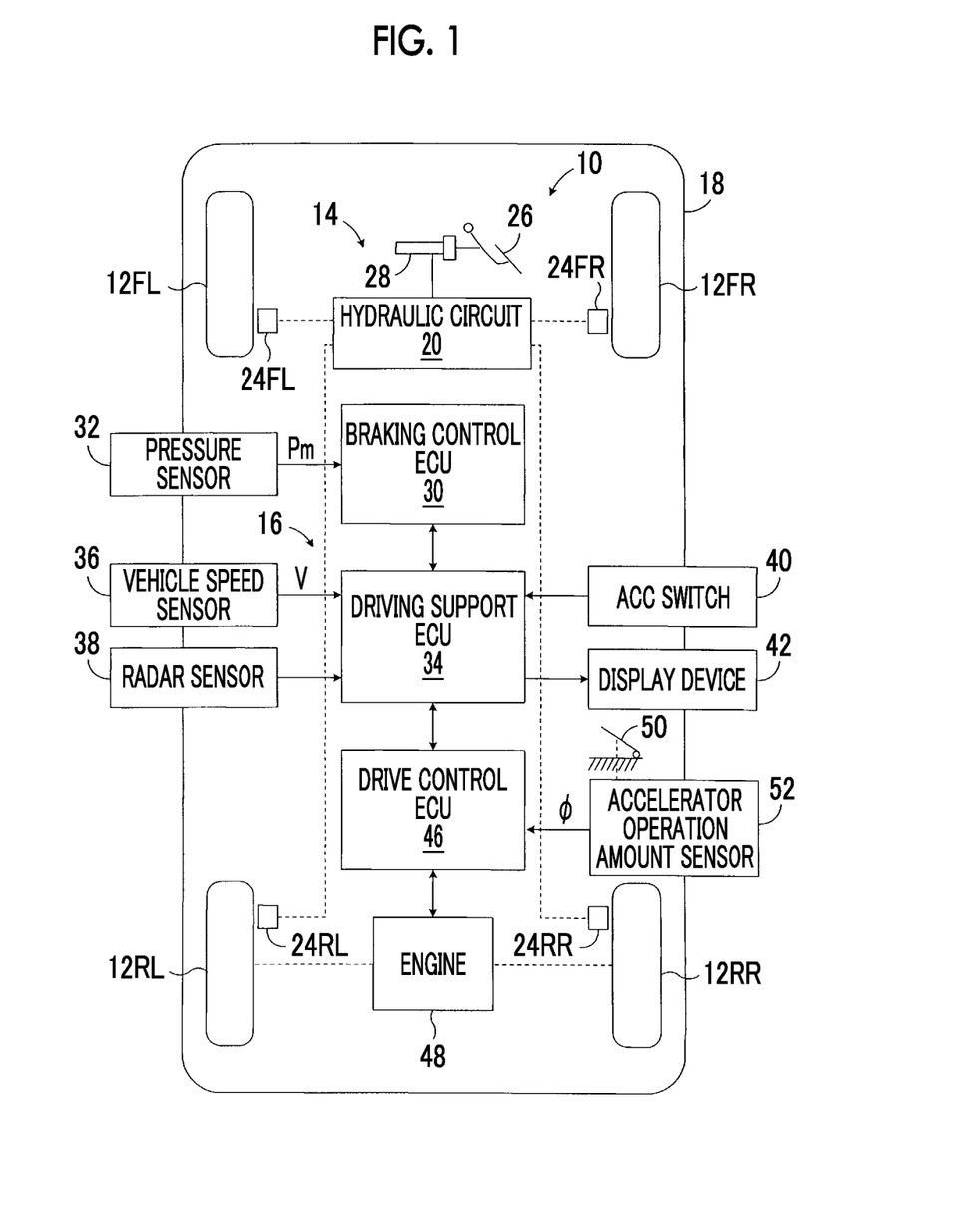
FIG. 1 is a schematic configuration diagram showing a first embodiment of a driving control device of a vehicle according to the disclosure.

FIG. 1 is a schematic configuration diagram showing a driving control device 10 of a vehicle according to a first embodiment of the disclosure.

In FIG. 1, the driving control device 10 is applied to a vehicle 18 having a braking device 14 which applies a braking force to right and left front wheels 12FR and 12FL and right and left rear wheels 12RR and 12RL, and a driving support control unit 16 which performs driving support control for supporting the driving of the vehicle 18 by a driver. The right and left front wheels 12FR and 12FL are steered wheels and are steered by a steering device in response to the steering of a steering wheel by the driver, although it is not shown in FIG. 1.

The braking device 14 includes a hydraulic circuit 20 as a brake actuator, and wheel cylinders 24FR, 24FL, 24RR, 24RL provided at the wheels 12FL to 12RL. The braking device 14 controls the pressure in the wheel cylinders 24FR to 24RL by the hydraulic circuit 20, thereby applying a braking force to each wheel and changing the braking force. As shown in FIG. 1, the braking device 14 has a master cylinder 28 which pressure-feeds brake oil in response to the depression of a brake pedal 26 by the driver.

Although not shown in FIG. 1, the hydraulic circuit 20 includes an oil reservoir, an oil pump, various valve devices, and the like. The braking pressure of each wheel cylinder is normally controlled by the master cylinder 28 which is driven according to the depression of the brake pedal 26 by the driver. The master cylinder 28 is provided with a pressure sensor 32 which detects master cylinder pressure Pm, and a signal indicating the master cylinder pressure Pm detected by the pressure sensor 32 is input to an electronic control unit for braking control 30 (hereinafter referred to as brake control ECU 30). Further, the braking pressure of each wheel cylinder is individually controlled by controlling the hydraulic circuit 20 by the brake control ECU 30, as needed. Accordingly, the braking device 14 can individually control the braking force on the respective wheels regardless of the braking operation of the driver.

The brake control ECU 30 controls the braking pressure of each wheel based on the master cylinder pressure Pm, and thereby controlling the braking force on each wheel according to the depression amount of the brake pedal 26, that is, the amount of braking operation by the driver. Further, the brake control ECU 30 controls the braking force on each wheel, as needed, based on a request from an electronic control unit for driving support 34 (hereinafter referred to as driving support ECU 34) of the driving support control unit 16, as will be described in detail later. In FIG. 1, an "electronic control unit" is written as an "ECU".

As shown in FIG. 1, a signal indicating a vehicle speed V detected by a vehicle speed sensor 36, and a signal indicating information in front of the vehicle 18 detected by a radar sensor 38 are input to the driving support ECU 34. Further, a signal indicating information such as whether or not to perform inter-vehicle distance control is input from an ACC switch 40 which is operated by the driver to the driving support ECU 34. The driving support ECU 34 displays a situation of the inter-vehicle distance control on a display device 42. The detection of information in front of the vehicle 18 may be performed by a camera such as a CCD camera or may be performed by a combination of a radar sensor and a camera.

Although not shown in FIG. 1, the ACC switch 40 includes an inter-vehicle distance control start button, an inter-vehicle distance control end button, and an inter-vehicle distance setting button and a vehicle speed setting button for setting a reference inter-vehicle distance Lc and a reference vehicle speed Vc, respectively. The driving support ECU 34 performs the inter-vehicle distance control according to the setting of these buttons. That is, the driving support ECU 34 starts the inter-vehicle distance control when the inter-vehicle distance control start button is pushed, and ends the inter-vehicle distance control when the inter-vehicle distance control end button is pushed. During the execution of the inter-vehicle distance control, the radar sensor 38 emits radio waves in a millimeter waveband to the front of the vehicle 18 and detects the reflected waves, thereby acquiring information in front of the vehicle 18, although it is not shown in the drawing.

When a difference $\Delta V$ (=V−Vc) between the vehicle speed V which is detected by the vehicle speed sensor 36 and the reference vehicle speed Vc is a positive value, the driving support ECU 34 outputs a braking request to the brake control ECU 30 as needed, such that the magnitude of the vehicle speed difference $\Delta V$ becomes less than or equal to a reference value Va (positive constant). If the braking request is input, the brake control ECU 30 controls the braking device 14 such that the braking force on the wheels 12FL to 12RL increases (braking force control in constant speed traveling control).

In contrast, when the vehicle speed difference $\Delta V$ is a negative value, the driving support ECU 34 outputs an acceleration request to an electronic control unit for drive control 46 (hereinafter referred to as drive control ECU 46) as needed, such that the magnitude of the vehicle speed difference $\Delta V$ becomes less than or equal to a reference value Vb (positive constant). If the acceleration request is input, the drive control ECU 46 controls the output of an engine 48 such that the driving forces of the right and left rear wheels 12RR and 12RL which are driving wheels increase. In the illustrated embodiment, the vehicle 18 is a rear-wheel-drive vehicle. However, the vehicle to which the disclosure is applied may be any of a front-wheel-drive vehicle, a rear-wheel-drive vehicle, and a four-wheel-drive vehicle.

Further, the driving support ECU 34 performs the inter-vehicle distance control for controlling the inter-vehicle distance between a host vehicle and a preceding vehicle. For example, the driving support ECU 34 determines the presence or absence of a preceding vehicle based on information in front of the vehicle 18 detected by the radar sensor 38, and when a preceding vehicle exists, the driving support ECU 34 estimates the distance L between the host vehicle 18 and the preceding vehicle. When the difference $\Delta L$ $(=L-Lc)$ between the distance L and a reference distance Lc is a positive value exceeding a reference value La (positive constant), the driving support ECU 34 outputs a braking request to the brake control ECU 30 such that the magnitude of the distance difference $\Delta L$ becomes less than or equal to the reference value La and greater than or equal to a reference value Lb (negative constant). If the braking request is input, the brake control ECU 30 controls the braking device 14 such that the braking force on the wheels 12FL to 12RL increases (braking force control in the inter-vehicle distance control).

In contrast, when the distance difference $\Delta L$ is a negative value smaller than the reference value Lb, the driving support ECU 34 outputs an acceleration request to the drive control ECU 46 such that the distance difference $\Delta L$ becomes greater than or equal to the reference value Lb and less than or equal to the reference value La. If the acceleration request is input, the drive control ECU 46 controls the output of the engine 48 such that the driving forces of the driving wheels increase.

When the braking request is not input to the brake control ECU 30, a control mode of the braking device 14 is set to a normal braking force control mode such that the braking force on the wheels 12FL to 12RL becomes a braking force corresponding to the master cylinder pressure Pm. When the acceleration request is not input, the drive control ECU 46 controls the output of the engine 48 based on an accelerator operation amount $\phi$ detected by an accelerator operation amount sensor 52 provided at an accelerator pedal 50. With respect to the above inter-vehicle distance control, refer to, for example, Japanese Unexamined Patent Application Publication No. 2003-34240 (JP 2003-34240 A).

Each of the brake control ECU 30, the driving support ECU 34, and the drive control ECU 46 may include a microcomputer having a CPU, a ROM, a RAM, and an input/output port device, which are connected to each other by bi-directional common buses. Each of programs for the braking control, the inter-vehicle distance control, and the like is stored in the ROM of a corresponding microcomputer, and each control is executed by the CPU according to the program. Further, the electronic control units 30, 34, and 46 mutually give and receive needed signals.

As will be described in detail later, in the first embodiment, the driving support ECU 34 performs driving control according to the flowchart shown in FIG. 2 and performs flag control according to the flowchart shown in FIG. 3.

Driving Control Routine

Next, a driving control routine in the first embodiment will be described with reference to the flowchart shown in FIG. 2. The driving control according to the flowchart shown in FIG. 2 is repeatedly executed at predetermined time intervals when an ignition switch (not shown) is ON and a target acceleration or deceleration of the inter-vehicle distance control is deceleration. Further, in the following description, the driving control according to the flowchart shown in FIG. 2 is simply referred to as "control". The same also applies to a second embodiment to be described later.

First, in step 10, a determination of whether or not a flag Fd is 1, that is, a determination of whether or not a driver is in an abnormal state is made. When an affirmative determination is made, the control proceeds to step 50, and when a negative determination is made, the control proceeds to step 20.

In step 20, a determination of whether or not a flag Fa is 0, that is, a determination of whether or not the inter-vehicle distance control is normal is made. When an affirmative determination is made, the control proceeds to step 100, and when a negative determination is made, the control proceeds to step 40.

In step 40, target deceleration Gbt of the vehicle is set to 0 and target deceleration Gbdet of the vehicle when the driver is in an abnormal state is set to Gbt (=0).

In step 50, a determination of whether or not the flag Fa changes from 0 to 1 (the inter-vehicle distance control changes from normality to abnormality) and the target deceleration Gbt of the vehicle is less than a predetermined value Gbemin (positive constant) is made. When a negative determination is made, the control proceeds to step 70, and when an affirmative determination is made, in step 60, a flag Fp is set to 1, and thereafter, the control proceeds to step 90. The fact that Fp is 1 indicates that there is a need to increase the target deceleration Gbt of the vehicle to the predetermined value Gbemin.

In step 70, a determination of whether or not the flag Fa is 0 or the target deceleration Gbt of the vehicle is greater than or equal to the predetermined value Gbemin is made. When a negative determination is made, the control proceeds to step 90, and when an affirmative determination is made, in step 80, the flag Fp is set to 0, and thereafter, the control proceeds to step 90.

In step 90, a determination of whether or not the flag Fa is 1, that is, a determination of whether or not abnormality has occurred in the inter-vehicle distance control is made. When an affirmative determination is made, the control proceeds to step 110. In contrast, when a negative determination is made, in step 100, the target deceleration Gbt of the vehicle is set to target deceleration Gat of the inter-vehicle distance control and the target deceleration Gbdet of the vehicle when the driver is in an abnormal state is set to Gbt (=Gat).

In step 110, a determination of whether or not the vehicle 18 is traveling is made by a determination of whether or not, for example, the vehicle speed V is greater than or equal to a reference value V0 (positive constant). When an affirmative determination is made, the control proceeds to step 130. In contrast, when a negative determination is made, in step 120, the target deceleration Gbt of the vehicle is set to 0 and the target deceleration Gbdet of the vehicle when the driver is in an abnormal state is set to Gbt (=0).

In step 130, a determination of whether or not the flag Fp is 1, that is, a determination of whether or not there is a need to increase the target deceleration Gbt of the vehicle to the predetermined value Gbemin is made. When a negative determination is made, in step 140, the target deceleration Gbt of the vehicle is set to the target deceleration Gbdet (the target deceleration set in step 100 immediately before the inter-vehicle distance control becomes abnormal). In contrast, when an affirmative determination is made, the control proceeds to step 150.

In step 150, provisional target deceleration Gbpt of the vehicle is set to Gbtf+$\Delta$Gbdet which is the sum of previous target deceleration Gbtf and a predetermined deceleration increment ΔGbdet (positive constant). Further, in step 150, the target deceleration Gbt of the vehicle is calculated according to the following expression (1). In the following expression (1) and expression (3) to be described later, MIN means the smaller value out of the two positive values in parentheses.

$$Gbt=\text{MIN}(Gbemin, Gbpt) \tag{1}$$

When steps 40, 100, 120, 140, and 150 are completed, the control proceeds to step 160. In step 160, a target braking force on each wheel for making the deceleration of the vehicle 18 the target deceleration Gbt is calculated and the braking device 14 is controlled such that the braking force on each wheel becomes a corresponding target braking force. In this way, the deceleration of the vehicle 18 is controlled so as to reach the target deceleration Gbt.

Figure 2:
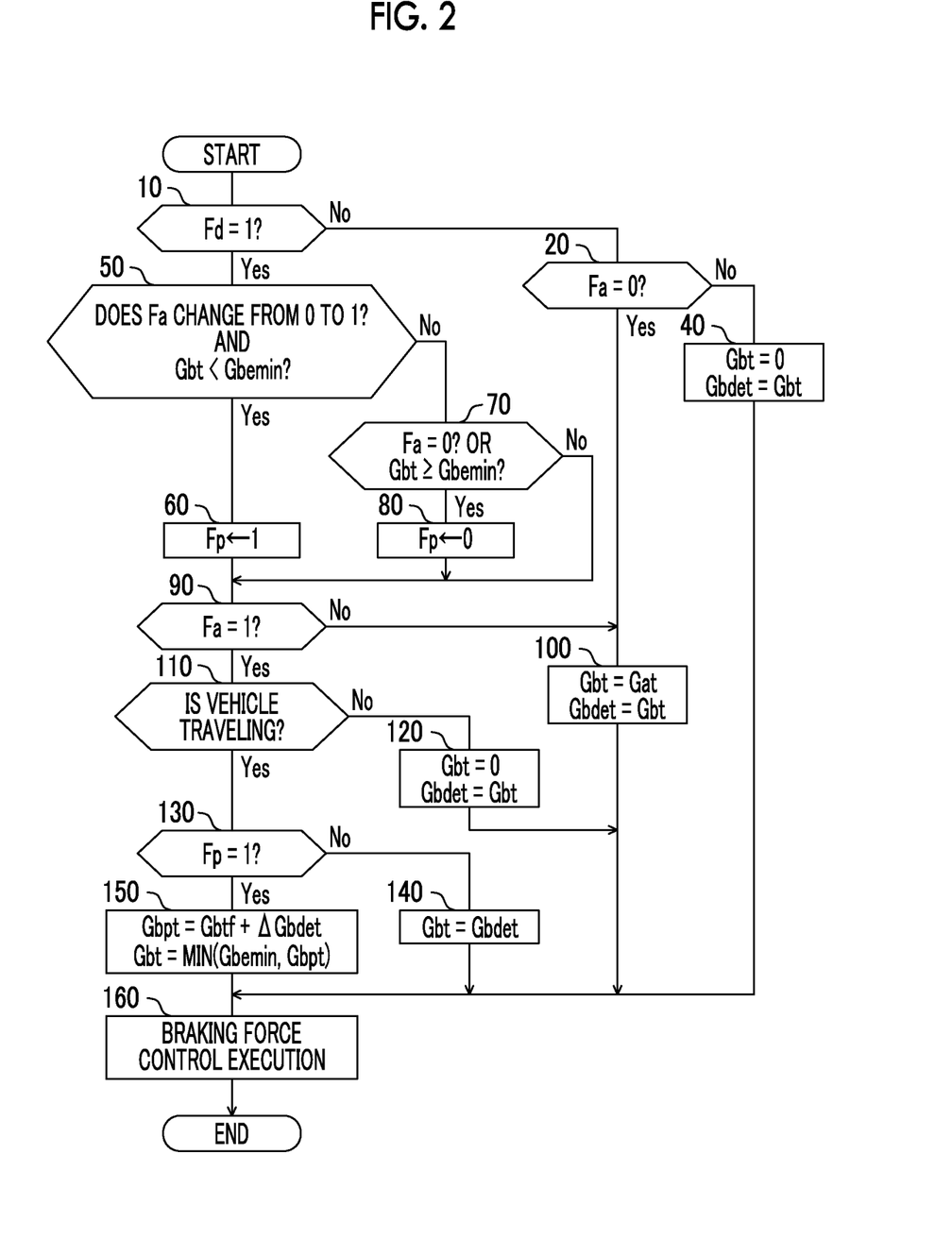
FIG. 2 is a flowchart showing a driving control routine in the first embodiment.

Although not shown in the flowchart of FIG. 2, when the inter-vehicle distance control or the driver shows abnormality in a situation where the target acceleration or deceleration of the inter-vehicle distance control is acceleration, a configuration may be made such that the target acceleration or deceleration is set to 0 and the vehicle is stopped by increasing the deceleration of the vehicle.

Next, a flag control routine concerning the flag Fa relating to the abnormality of the inter-vehicle distance control and the flag Fd relating to the abnormality of the driver will be described with reference to the flowchart shown in FIG. 3. The flag control according to the flowchart shown in FIG. 3 is repeatedly executed at predetermined time intervals when the ignition switch (not shown) is ON. Further, the flags Fa, Fd, and Fp are each initialized to 0 at the start of the traveling of the vehicle 18.

First, in step 210, a determination of whether or not the braking device 14 is normal, that is, a determination of whether or not it is possible to control the braking force on each wheel so as to reach a corresponding target braking force is made by, for example, self-checking known in the art. When an affirmative determination is made, the flag control proceeds to step 230, and when a negative determination is made, in step 220, the traveling of the vehicle 18 is prohibited. When the vehicle is traveling, the vehicle is decelerated over the driving control according to the routine shown in FIG. 2, whereby the vehicle is stopped.

In step 230, a determination of whether or not the inter-vehicle distance control is normal is made by, for example, self-checking known in the art. When an affirmative determination is made, in step 240, the flag Fa is reset to 0 or is maintained at 0 and the target deceleration Gat of the inter-vehicle distance control is calculated in a manner known in the art. In contrast, when a negative determination is made, that is, when a determination that the inter-vehicle distance control is abnormal is made, in step 250, the flag Fa is set to 1 and the target deceleration Gat of the inter-vehicle distance control is set to 0.

In step 260, a determination of whether or not the driver is in a normal state is made in a manner known in the art, such as a manner described in JP 2016-45713 A, for example. When an affirmative determination is made, in step 270, the flag Fd is reset to 0 or is maintained at 0. In contrast, when a negative determination is made, that is, when a determination that the driver is in an abnormal state is made, in step 280, the flag Fd is set to 1.

As can be seen from the above description, step 210 and step 230 function as an abnormality determination device concerning the driving support control, which determines whether or not abnormality in which the driving support control cannot be performed normally due to factors other than the abnormality of the braking device 14 has occurred. Further, step 260 functions as an abnormality determination device for the driver, which determines the abnormality of the driver by a determination of whether or not the driver is in a normal state.

Operation of First Embodiment

Next, with respect to various cases where whether or not the driver and the inter-vehicle distance control are normal is different, an operation of the first embodiment will be described.

(A1) In a case where the driver and the inter-vehicle distance control are normal, a negative determination is made in step 10 and an affirmative determination is made in step 20. Accordingly, in step 100, the target deceleration Gbt of the vehicle is set to the target deceleration Gat of the inter-vehicle distance control, and the target deceleration Gbdet of the vehicle when the driver is in an abnormal state is set to Gbt (=Gat). Therefore, deceleration Gb of the vehicle is controlled so as to reach the target deceleration Gat of the inter-vehicle distance control.

(B1) In a case where the driver is in a normal state, but the inter-vehicle distance control changes to an abnormality state, a negative determination is made in steps 10 and 20. Accordingly, in step 40, the target deceleration Gbt of the vehicle is set to 0 and the target deceleration Gbdet of the vehicle when the driver is in an abnormal state is set to Gbt (=0). Further, in step 250 of FIG. 3, the target deceleration Gat of the inter-vehicle distance control is set to 0. Therefore, the inter-vehicle distance control is not executed, the vehicle is not automatically decelerated, and the acceleration or deceleration of the vehicle is entrusted to the driving operation of the driver.

(C1) In a case where the inter-vehicle distance control is normal; however, the driver changes to an abnormality state, an affirmative determination and a negative determination are respectively made in steps 10 and 50 and an affirmative determination and a negative determination are respectively made in steps 70 and 90. Accordingly, in step 100, the target deceleration Gbt of the vehicle is set to the target deceleration Gat of the inter-vehicle distance control, and the target deceleration Gbdet of the vehicle when the driver is in an abnormal state is set to Gbt (=Gat). Therefore, the deceleration Gb of the vehicle is controlled so as to reach the target deceleration Gat of the inter-vehicle distance control.

(D1) In a case where the inter-vehicle distance control changes to an abnormality state in a situation where the driver is in an abnormal state, when the target deceleration Gbt of the vehicle is less than the predetermined value Gbemin, an affirmative determination is made in each of steps 10 and 50. When the vehicle 18 is traveling, an affirmative determination is made in each of steps 90, 110, and 130. Accordingly, in step 150, the provisional target deceleration Gbpt of the vehicle is set to Gbtf+ΔGbdet which is the sum of the previous target deceleration Gbtf and the predetermined deceleration increment ΔGbdet, and the target deceleration Gbt of the vehicle is calculated according to the expression (1).

Therefore, even if the inter-vehicle distance control changes to an abnormality state in a situation where the driver is in an abnormal state, and the target deceleration Gbt of the vehicle at that time is less than the predetermined value Gbemin, the target deceleration Gbt is gradually increased until it reaches the predetermined value Gbemin, and is then maintained at the predetermined value Gbemin (refer to a case (Z1) to be described later). Accordingly, not only by preventing the deceleration of the vehicle from being stopped due to the inter-vehicle distance control being stopped when the inter-vehicle distance control has changed to an abnormality state, but also by increasing the deceleration of the vehicle to a value corresponding to the predetermined value Gbemin, it is possible to effectively decelerate and stop the vehicle.

In contrast, when the target deceleration Gbt of the vehicle is greater than or equal to the predetermined value Gbemin, an affirmative determination and a negative determination are respectively made in steps 10 and 50 and an affirmative determination is made in step 70. When the vehicle 18 is traveling, an affirmative determination is made in each of steps 90 and 110, and a negative determination is made in step 130. Accordingly, in step 140, the target deceleration Gbt of the vehicle is set to the target deceleration Gbdet set in step 100.

Therefore, when the inter-vehicle distance control changes to an abnormality state in a situation where the driver is in an abnormal state, and the target deceleration Gbt of the vehicle at that time is greater than or equal to the predetermined value Gbemin, the target deceleration Gbt is maintained at the target deceleration Gat of the inter-vehicle distance control when the inter-vehicle distance control has become abnormal (refer to cases (X1 and Y1) to be described later). Accordingly, also in this case, not only by preventing the deceleration of the vehicle from being stopped, but also by controlling the deceleration of the vehicle to a high value greater than or equal to a value corresponding to the predetermined value Gbemin, it is possible to effectively decelerate and stop the vehicle.

Specific Examples of Operation of First Embodiment

Next, with respect to the following cases X1 to Z1 in which situations when the inter-vehicle distance control becomes abnormal are different from each other, the operation of the first embodiment will be described.

Figure 4:
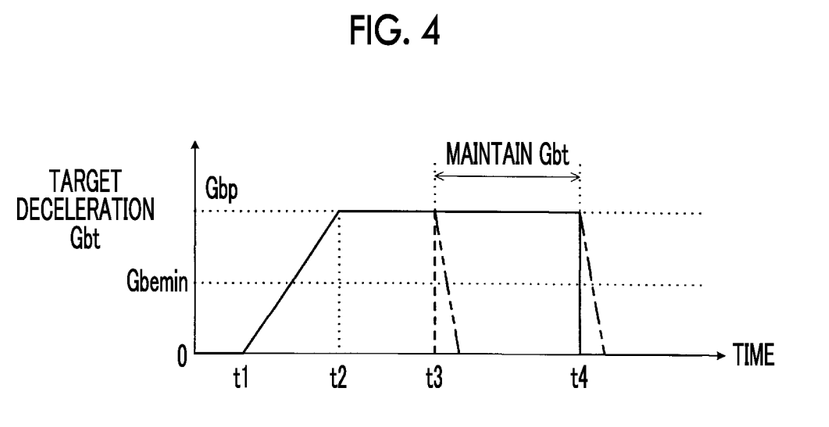
FIG. 4 is a diagram showing a specific example of an operation of the first embodiment in a case where a driver shows abnormality when target deceleration is constant at a predetermined value or more.

A Case X1 where the Inter-Vehicle Distance Control Becomes Abnormal when Gbt is Constant at Gbemin or More (FIG. 4)

FIG. 4 shows an operation in a case where the inter-vehicle distance control becomes abnormal when the target deceleration Gbt is constant at the predetermined value Gbemin or more. At time point t1, the driver shows abnormality, and the target deceleration Gbt is increased until time point t2 and then becomes constant. It is assumed that the inter-vehicle distance control becomes abnormal at time point t3 and the vehicle 18 stops at time point t4. The broken line shows a change in the target deceleration Gbt in the case of an inter-vehicle distance control of the related art.

The assumption described above and the meaning of the broken line are also the same with respect to FIGS. 5 and 6 to be described later, FIGS. 8 to 10 relating to a second embodiment, and FIG. 11 relating to a modification example of the second embodiment. Further, in FIGS. 4 to 6, and 8 to 11, a dot-and-dash line and a two-dot chain line show examples of a change in the actual deceleration of the vehicle 18 when the target deceleration Gbt becomes zero.

In the case of the inter-vehicle distance control of the related art, the inter-vehicle distance control is stopped at time point t3 at which the inter-vehicle distance control becomes abnormal, whereby the target deceleration Gbt of the vehicle becomes zero. Accordingly, the vehicle is not decelerated.

In contrast, in the case of the first embodiment, even after the inter-vehicle distance control becomes abnormal at time point t3, the target deceleration Gbt is maintained at a constant value greater than or equal to the predetermined value Gbemin. Therefore, even after the inter-vehicle distance control becomes abnormal, it is possible to continue the deceleration of the vehicle and stop the vehicle.

Figure 5:
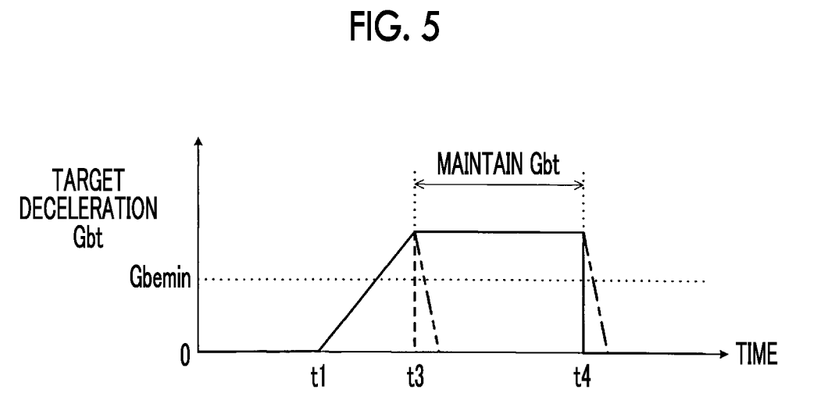
FIG. 5 is a diagram showing a specific example of an operation of the first embodiment in a case where a driver shows abnormality when the target deceleration is increasing at a predetermined value or more.

A Case Y1 where the Inter-Vehicle Distance Control Becomes Abnormal when Gbt is Increasing at Gbemin or More (FIG. 5)

FIG. 5 shows an operation in a case where the inter-vehicle distance control becomes abnormal when the target deceleration Gbt is increasing at the predetermined value Gbemin or more.

In the case of the inter-vehicle distance control of the related art, similar to the case X1, at time point t3 at which the inter-vehicle distance control becomes abnormal, the inter-vehicle distance control is stopped, whereby the target deceleration Gat of the vehicle becomes zero. Accordingly, the vehicle is not decelerated.

In contrast, in the case of the first embodiment, if the inter-vehicle distance control becomes abnormal at time point t3, the target deceleration Gbt does not increase and is maintained at a value (a value greater than or equal to the predetermined value Gbemin) at that time point. Therefore, even after the inter-vehicle distance control becomes abnormal, it is possible to continue the deceleration of the vehicle and stop the vehicle.

Figure 6:
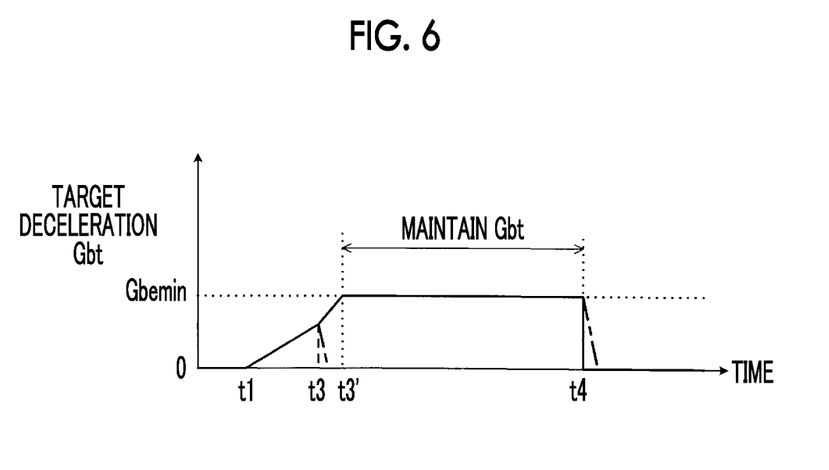
FIG. 6 is a diagram showing a specific example of an operation of the first embodiment in a case where a driver shows abnormality when the target deceleration is less than a predetermined value.

A Case Z1 where the Inter-Vehicle Distance Control Becomes Abnormal when Gbt is Less than Gbemin (FIG. 6)

FIG. 6 shows an operation in a case where the inter-vehicle distance control becomes abnormal when the target deceleration Gbt is less than the predetermined value Gbemin.

In the case of the inter-vehicle distance control of the related art, similar to the case X1, at time point t3 at which the inter-vehicle distance control becomes abnormal, the inter-vehicle distance control is stopped, whereby the target deceleration Gbt of the vehicle becomes zero. Accordingly, the vehicle is not decelerated.

In contrast, in the case of the first embodiment, even if the inter-vehicle distance control becomes abnormal at time point t3, the target deceleration Gbt is increased until it reaches the predetermined value Gbemin at time point t3'. The target deceleration Gbt is maintained at the predetermined value Gbemin at time point t3' or later. Therefore, even after the inter-vehicle distance control becomes abnormal, it is possible to continue the deceleration of the vehicle and stop the vehicle.

Second Embodiment

Figure 7:
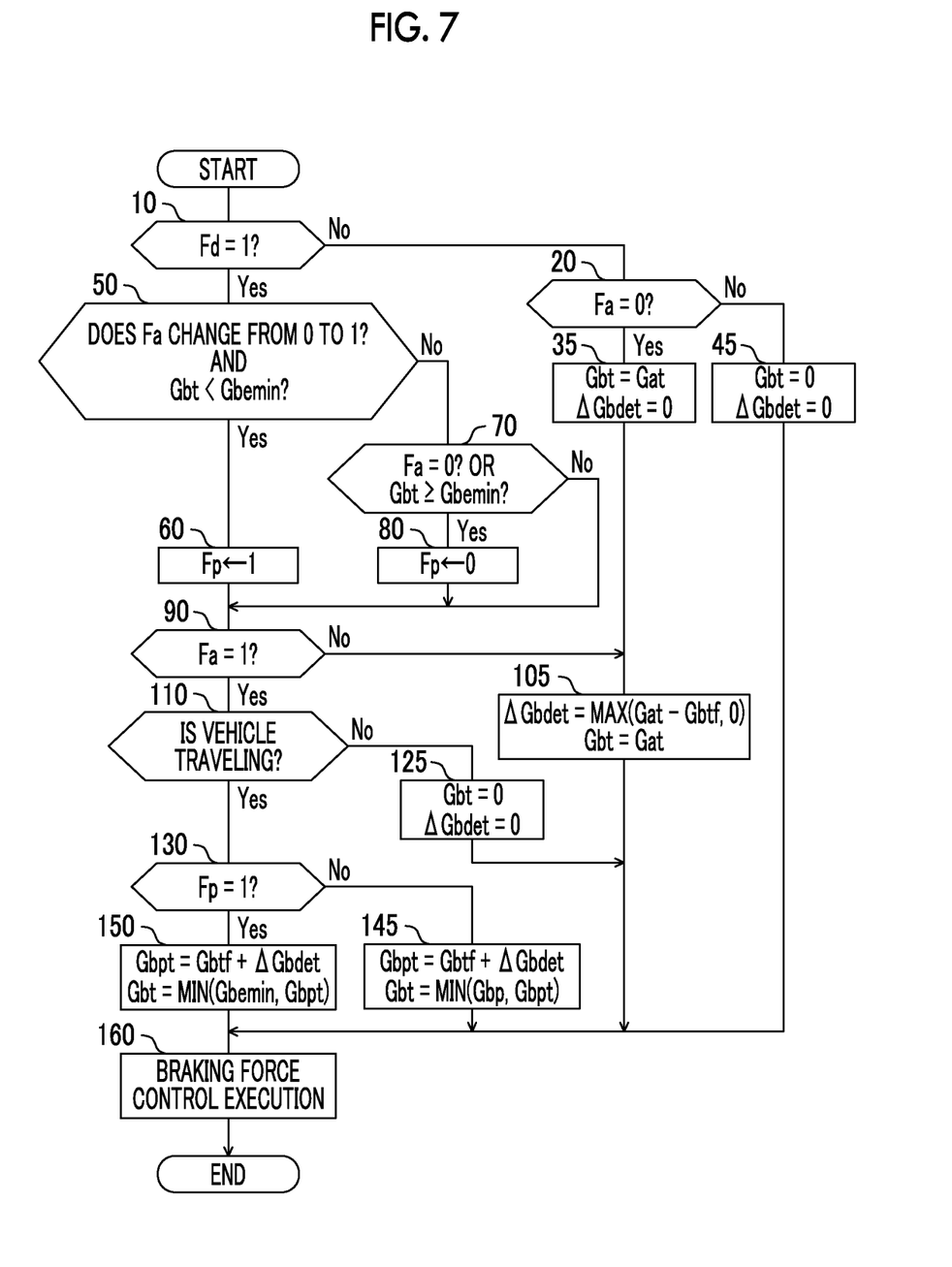
FIG. 7 is a flowchart showing a driving control routine in a second embodiment.

FIG. 7 is a flowchart showing a driving control routine in the driving control device 10 of a vehicle according to a second embodiment of the disclosure. In FIG. 7, the same steps as those in the flowchart shown in FIG. 2 are denoted by the same step numbers as those in FIG. 2. As can be seen from the comparison between FIG. 7 and FIG. 2, steps other than steps which are described below are executed in the same manner as in the case of the first embodiment. Further, the flag control concerning the flag Fa relating to the abnormality of the inter-vehicle distance control and the flag Fd relating to the abnormality of the driver is the same as that in the first embodiment.

In the driving control of the second embodiment, in step 20, when a negative determination is made, that is, when a determination that the inter-vehicle distance control is abnormal is made, the control proceeds to step 45. In contrast, if an affirmative determination is made, the control proceeds to step 35.

In step 35, the target deceleration Gbt of the vehicle is set to the target deceleration Gat of the inter-vehicle distance control, and the target deceleration increment ΔGbdet for each cycle when the driver is in an abnormal state is set to 0.

In step 45, the target deceleration Gbt of the vehicle is set to 0, and the target deceleration increment ΔGbdet for each cycle when the driver is in an abnormal state is set to 0.

When a negative determination is made in step 90, that is, when a determination that the inter-vehicle distance control is normal is made, the control proceeds to step 105. In step 105, the target deceleration increment ΔGbdet for each cycle when the driver is in an abnormal state is calculated according to the following expression (2) and the target deceleration Gbt of the vehicle is set to the target deceleration Gat of the inter-vehicle distance control. In the following expression (2) and expression (4) to be described later, MAX means the larger value out of the two positive values in parentheses, and therefore, the increment ΔGbdet does not become a negative value. Further, Gbtf in the following expression (2) is the target deceleration of the vehicle in the previous cycle.

$$\Delta Gbdet = \text{MAX}(Gat - Gbtf, 0) \qquad (2)$$

When a negative determination is made in step 110, that is, when a determination that the vehicle 18 is at a stop is made, the control proceeds to step 125. In step 125, similar to step 45, the target deceleration Gbt of the vehicle is set to 0, and the target deceleration increment ΔGbdet for each cycle when the driver is in an abnormal state is set to 0.

When a negative determination is made in step 130, that is, when a determination that the target deceleration Gbt of the vehicle is greater than or equal to the predetermined value Gbemin and there is no need to increase the target deceleration Gbt to the predetermined value Gbemin is made, the control proceeds to step 145. In step 145, the provisional target deceleration Gbpt of the vehicle is set to Gbtf+ΔGbdet which is the sum of the target deceleration Gbtf of the previous cycle and the predetermined deceleration increment ΔGbdet. Further, in step 145, the target deceleration Gbt of the vehicle is calculated according to the following expression (3). In the following expression (3), Gbp is an allowable maximum deceleration (a positive constant greater than Gbemin) set in advance. Further, ΔGbdet in steps 145 and 150 is the value calculated in step 105 immediately before the inter-vehicle distance control becomes abnormal.

$$Gbt = \text{MIN}(Gbp, Gbpt) \qquad (3)$$

Operation of Second Embodiment

Next, with respect to various cases where whether or not the driver and the inter-vehicle distance control are normal is different, an operation of the second embodiment will be described.

(A2) In a case where the driver and the inter-vehicle distance control are normal, a negative determination is made in step 10 and an affirmative determination is made in step 20. Accordingly, in step 35, the target deceleration Gbt of the vehicle is set to the target deceleration Gat of the inter-vehicle distance control, and the target deceleration increment ΔGbdet for each cycle when the driver is in an abnormal state is set to 0. Therefore, the deceleration Gb of the vehicle is controlled so as to reach the target deceleration Gat of the inter-vehicle distance control.

(B2) In a case where the driver is in a normal state, but the inter-vehicle distance control changes to an abnormality state, a negative determination is made in steps 10 and 20. Accordingly, in step 45, the target deceleration Gbt of the vehicle is set to 0 and the target deceleration increment ΔGbdet for each cycle when the driver is in an abnormal state is set to 0. Therefore, the inter-vehicle distance control is not executed, the vehicle is not automatically decelerated, and the acceleration or deceleration of the vehicle is entrusted to the driving operation of the driver.

(C2) In a case where the inter-vehicle distance control is normal; however, the driver changes to an abnormality state, an affirmative determination and a negative determination are respectively made in steps 10 and 50 and an affirmative determination and a negative determination are respectively made in steps 70 and 90. Accordingly, in step 105, the target deceleration increment ΔGbdet for each cycle when the driver is in an abnormal state is calculated to a value greater than or equal to 0 according to the expression (2) and the target deceleration Gbt of the vehicle is set to the target deceleration Gat of the inter-vehicle distance control. Therefore, the target deceleration increment ΔGbdet is calculated to a value that prevents a decrease in the deceleration Gb of the vehicle, and the deceleration Gb of the vehicle is controlled so as to reach the target deceleration Gat of the inter-vehicle distance control.

(D2) In a case where the inter-vehicle distance control changes to an abnormality state in a situation where the driver is in an abnormal state, when the target deceleration Gbt of the vehicle is less than the predetermined value Gbemin, an affirmative determination is made in each of steps 10 and 50. When the vehicle 18 is traveling, an affirmative determination is made in each of steps 90, 110, and 130. Accordingly, in step 150, the provisional target deceleration Gbpt of the vehicle is set to Gbtf+ΔGbdet which is the sum of the previous target deceleration Gbtf and the predetermined deceleration increment ΔGbdet, and the target deceleration Gbt of the vehicle is calculated according to the expression (1).

Therefore, even if the inter-vehicle distance control changes to an abnormality state in a situation where the driver is in an abnormal state, and the target deceleration Gbt of the vehicle at that time is less than the predetermined value Gbemin, if the target deceleration Gat of the inter-vehicle distance control is in an increase process, the target deceleration Gbt is gradually increased until it reaches the predetermined value Gbemin, and is then maintained at the predetermined value Gbemin (refer to a case (Z2) to be described later). Accordingly, not only by preventing the deceleration of the vehicle from being stopped due to the inter-vehicle distance control being stopped when the inter-vehicle distance control has changed to abnormality, but also by increasing the deceleration of the vehicle to a value corresponding to the predetermined value Gbemin, it is possible to effectively decelerate and stop the vehicle.

In contrast, when the target deceleration Gbt of the vehicle is greater than or equal to the predetermined value Gbemin, an affirmative determination and a negative determination are respectively made in steps 10 and 50 and an affirmative determination is made in step 70. When the vehicle 18 is traveling, an affirmative determination is made in each of steps 90 and 110 and a negative determination is made in step 130. Accordingly, in step 145, the provisional target deceleration Gbpt of the vehicle is set to Gbtf+ΔGbdet which is the sum of the target deceleration Gbtf of the previous cycle and the deceleration increment ΔGbdet calculated in step 105. Further, the target deceleration Gbt of the vehicle is calculated to a larger value out of the allowable maximum deceleration Gbp set in advance and the provisional target deceleration Gbpt.

Therefore, when the inter-vehicle distance control changes to an abnormality state in a situation where the driver is in an abnormal state, and the target deceleration Gbt of the vehicle at that time is greater than or equal to the predetermined value Gbemin, the target deceleration Gbt is increased with the deceleration increment ΔGbdet calculated immediately before the inter-vehicle distance control becomes abnormal as the increment for each cycle (refer to cases (X2 and Y2) to be described later). Accordingly, also in this case, not only by preventing the deceleration of the vehicle from being stopped, but also by controlling the deceleration of the vehicle to a high value corresponding to the target deceleration Gbt greater than or equal to the predetermined value Gbemin and less than or equal to the allowable maximum deceleration Gbp, it is possible to effectively decelerate and stop the vehicle.

Specific Examples of Operation of Second Embodiment

Next, with respect to the following cases X2 to Z2 in which situations when the inter-vehicle distance control becomes abnormal are different from each other, the operation of the second embodiment will be described.

Figure 8:
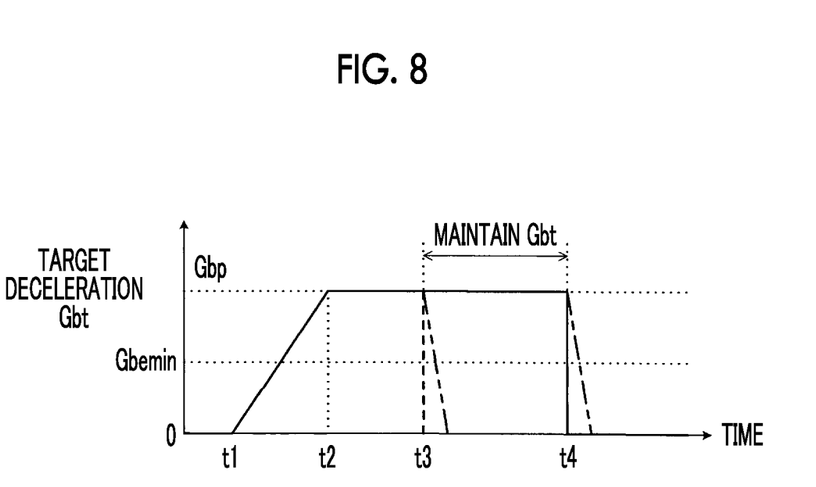
FIG. 8 is a diagram showing a specific example of an operation of the second embodiment in a case where a driver shows abnormality when the target deceleration is constant at a predetermined value or more.

A Case X2 where the Inter-Vehicle Distance Control Becomes Abnormal when Gbt is Constant at Gbemin or More (FIG. 8)

FIG. 8 shows an operation in a case where the inter-vehicle distance control becomes abnormal when the target deceleration Gbt is constant at the predetermined value Gbemin or more, similar to FIG. 4.

As can be seen from the comparison between FIG. 8 and FIG. 4, the operation of the second embodiment in this case is the same as the operation of the first embodiment. Accordingly, even after the inter-vehicle distance control becomes abnormal at time point t3, the target deceleration Gbt is maintained at a constant value greater than or equal to the predetermined value Gbemin, and therefore, it is possible to continue the deceleration of the vehicle and stop the vehicle.

Figure 9:
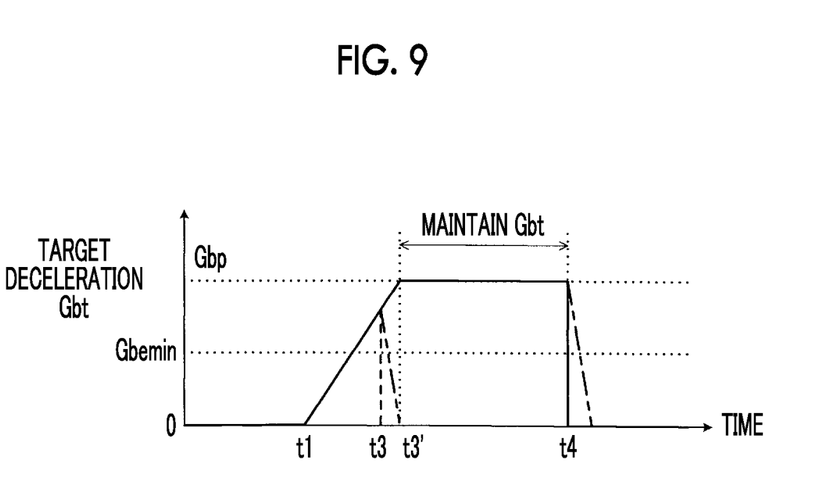
FIG. 9 is a diagram showing a specific example of an operation of the second embodiment in a case where a driver shows abnormality when the target deceleration is increasing at a predetermined value or more.

A Case Y2 where the Inter-Vehicle Distance Control Becomes Abnormal when Gbt is Increasing at Gbemin or More (FIG. 9)

FIG. 9 shows an operation in a case where the inter-vehicle distance control becomes abnormal when the target deceleration Gbt is increasing at the predetermined value Gbemin or more, similar to FIG. 5.

If the inter-vehicle distance control becomes abnormal at time point t3, the increasing rate of the target deceleration Gbt immediately before the inter-vehicle distance control becomes abnormal is maintained, whereby the target deceleration Gbt is increased until it reaches the allowable maximum deceleration Gbp set in advance, at time point t3'. The target deceleration Gbt is maintained at the allowable maximum deceleration Gbp at time point t3' or later. Therefore, even after the inter-vehicle distance control becomes abnormal, it is possible to continue the deceleration of the vehicle with the target deceleration Gbt made to be higher than in the case of the first embodiment and to more effectively stop the vehicle than in the case of the first embodiment.

Figure 10:
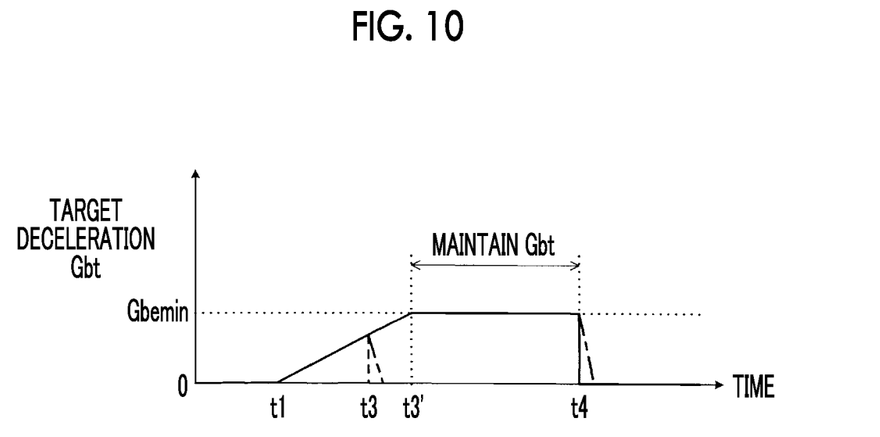
FIG. 10 is a diagram showing a specific example of an operation of the second embodiment in a case where a driver shows abnormality when the target deceleration is less than a predetermined value.
Figure 11:
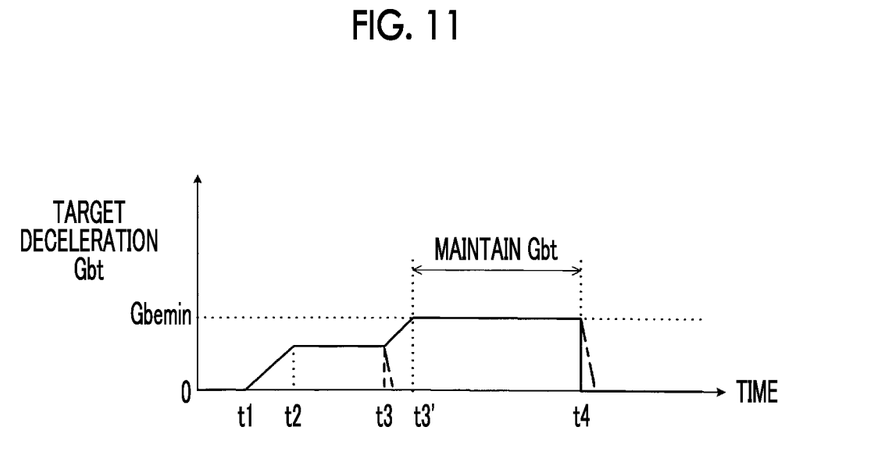
FIG. 11 is a diagram showing a specific example of an operation of a modification example of the second embodiment in a case where a driver shows abnormality when the target deceleration is less than a predetermined value.

A Case Z2 where the Inter-Vehicle Distance Control Becomes Abnormal when Gbt is Less than Gbemin (FIG. 10)

FIG. 10 shows an operation in a case where the inter-vehicle distance control becomes abnormal when the target deceleration Gbt is less than the predetermined value Gbemin, similar to FIG. 6.

Even when the inter-vehicle distance control becomes abnormal at time point t3, the increasing rate of the target deceleration Gbt immediately before the inter-vehicle distance control becomes abnormal is maintained, whereby the target deceleration Gbt is increased until it reaches the predetermined value Gbemin at time point t3'. The target deceleration Gbt is maintained at the predetermined value Gbemin at time point t3' or later. Therefore, even after the inter-vehicle distance control becomes abnormal, it is possible to continue the deceleration of the vehicle and stop the vehicle.

In step 105, the target deceleration increment ΔGbdet for each cycle when the driver is in an abnormal state may be modified so as to be calculated according to the following expression (4). ΔGbc in the following expression (4) is a positive constant set in advance.

$$\Delta Gbdet = \text{MAX}(Gat - Gbtf, \Delta Gbc) \quad (4)$$

According to this modification example, even in a case where the increasing rate of the target deceleration Gbt immediately before the inter-vehicle distance control becomes abnormal is 0 or less, the target deceleration increment ΔGbdet for each cycle when the driver is in an abnormal state is not 0 and becomes a positive value. Accordingly, for example, as shown in FIG. 11, even if the increasing rate of the target deceleration Gbt immediately before the inter-vehicle distance control becomes abnormal is 0 or less, it is possible to reliably increase the target deceleration Gbt after the inter-vehicle distance control becomes abnormal.

Further, according to the first and second embodiments and the modification example described above, in a case where the inter-vehicle distance control changes to an abnormality state in a situation where the driver is in an abnormal state, the vehicle is decelerated until the vehicle stops. Accordingly, it is possible to reliably stop the vehicle.

Further, according to the disclosure, the electronic control unit may be configured to maintain the target deceleration of the vehicle when the driving support control is unable to be performed normally, when the target deceleration of the vehicle when the driving support control is unable to be performed normally is greater than or equal to the predetermined value. Accordingly, it is possible to effectively decelerate and stop the vehicle by controlling the deceleration of the vehicle to a value greater than or equal to a value corresponding to the predetermined value, in a situation where the driver is in an abnormal state and the driving support control is unable to be performed normally.

According to the disclosure, the electronic control unit may be configured to increase the target deceleration of the vehicle to the predetermined value or more when the target deceleration of the vehicle when the driving support control is unable to be performed normally is less than the predetermined value. Accordingly, even in a situation where the target deceleration of the vehicle when the driving support control is unable to be performed normally is less than the predetermined value, it is possible to effectively decelerate and stop the vehicle by controlling the deceleration of the vehicle to a value greater than or equal to a value corresponding to the predetermined value.

According to the disclosure, the electronic control unit may be configured, when the target deceleration of the vehicle when the driving support control is unable to be performed normally is greater than or equal to the predetermined value, and when a rate of change in the target deceleration of the vehicle is an increasing rate of change, to maintain the increasing rate of change and increase the target deceleration of the vehicle until the target deceleration reaches an allowable deceleration set in advance. Accordingly, it is possible to maintain the increasing rate of change and increase the target deceleration of the vehicle, even after the driving support control becomes to be unable to be performed normally. After the driving support control becomes to be unable to be performed normally in a situation where the driver is in an abnormal state, it is possible to effectively decelerate the vehicle by controlling the deceleration of the vehicle to a value greater than or equal to a value corresponding to the predetermined value, and it is possible to prevent rapid change in the deceleration of the vehicle.

According to the disclosure, the electronic control unit may be configured, when the target deceleration of the vehicle when the driving support control is unable to be performed normally is less than the predetermined value and a rate of change in the target deceleration of the vehicle is an increasing rate of change, to maintain the increasing rate of change and increase the target deceleration of the vehicle until the target deceleration reaches the predetermined value or more. Accordingly, it is possible to maintain the increasing rate of change and increase the target deceleration of the vehicle until the target deceleration reaches the predetermined value or more, even when the target deceleration of the vehicle when the driving support control is unable to be performed normally is less than the predetermined value. After the driving support control becomes unable to be performed normally in a situation where the driver is in an abnormal state, it is possible to effectively decelerate the vehicle by increasing the deceleration of the vehicle to a value greater than or equal to a value corresponding to the predetermined value, and it is possible to prevent rapid change in the deceleration of the vehicle.

In the above, the disclosure has been described in detail with respect to specific embodiments. However, it will be apparent to those skilled in the art that the disclosure is not limited to the embodiments described above and various other embodiments can be made within the scope of the disclosure.

For example, in each of the embodiments described above, the driving support control is the inter-vehicle distance control. However, the driving support control may be arbitrary driving support control which controls the braking device and the drive device such that the acceleration or deceleration of the vehicle reaches the target acceleration or deceleration, like constant speed traveling control, collision prevention control, and the like.

Further, in each of the embodiments described above, in a case where the inter-vehicle distance control becomes abnormal when the target deceleration Gbt is less than the predetermined value Gbemin, the target deceleration Gbt is increased until it reaches the predetermined value Gbemin. However, the target deceleration Gbt may be modified to be increased until it reaches a value higher than the predetermined value Gbemin and less than or equal to the allowable maximum deceleration Gbp set in advance.

Figure 3:
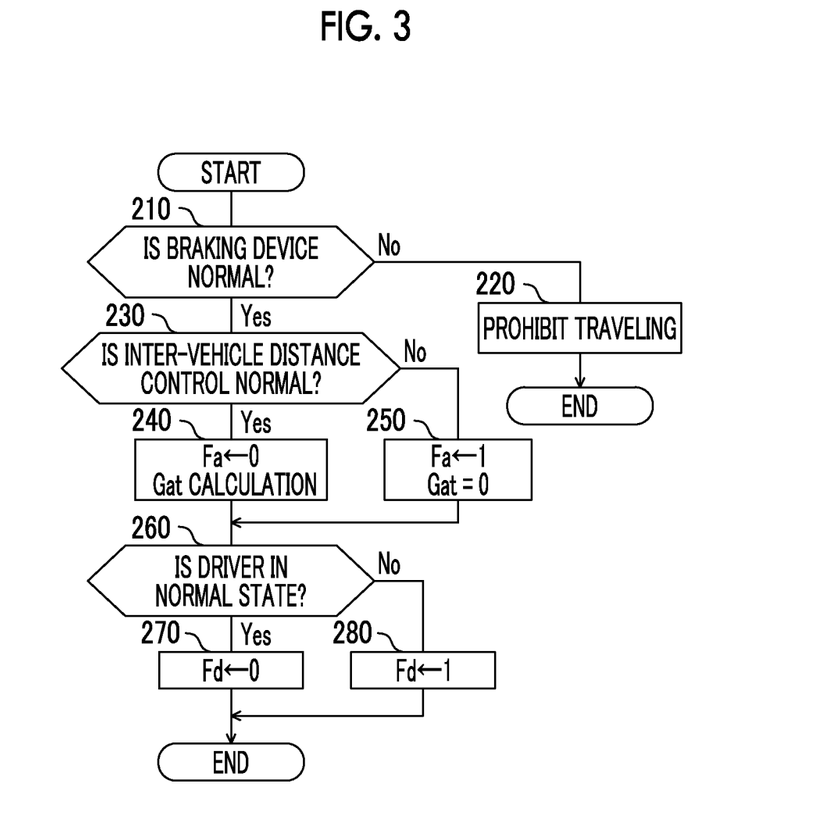
FIG. 3 is a flowchart showing a flag control routine concerning a flag relating to abnormality of inter-vehicle distance control and a flag relating to abnormality of a driver in the first embodiment.

Further, in each of the embodiments described above, the flags concerning the flag Fa relating to the abnormality of the inter-vehicle distance control and the flag Fd relating to the abnormality of the driver are controlled according to the flowchart shown in FIG. 3. However, the flag concerning the flag Fd regarding the abnormality of the driver may be controlled by a control routine different from the control of the flag Fa relating to the abnormality of the inter-vehicle distance control.

Further, in the first embodiment described above, the predetermined deceleration increment ΔGbdet when increasing the target deceleration Gbt of the vehicle to the predetermined value Gbemin is a positive constant. However, the predetermined deceleration increment ΔGbdet may be modified so as to be variably set according to the magnitude, the rate of change, or the like of the target deceleration Gbt of the vehicle immediately before the inter-vehicle distance control becomes abnormal.

What is claimed is:

1. A driving control device of a vehicle, comprising
a brake device configured to apply a braking force to wheels; and
an electronic control unit, the electronic control unit configured to:
perform driving support control by calculating target deceleration of the vehicle and controlling the brake device such that deceleration of the vehicle reaches the target deceleration;
determine whether or not the driving support control is unable to be performed normally because it is not possible to properly detect the target deceleration of the vehicle due to an abnormality in a detection device or in a signal transmission path from the detection device to a control device; and
determine whether or not a driver is in an abnormal state in which the driver cannot perform normal driving due to loss of a physical condition,
wherein:
in a case that the electronic control unit determines that (a) the driving support control is unable to be performed normally because it is not possible to properly detect the target deceleration of the vehicle due to an abnormality in a detection device or in a signal transmission path from the detection device to a control device and (b) the driver is not in the abnormal state, the electronic control unit is configured to stop the driving support control, and
in a case that the electronic control unit determines that (a) the driving support control is unable to be performed normally because it is not possible to properly detect the target deceleration of the vehicle due to an abnormality in a detection device or in a signal transmission path from the detection device to a control device and (b) the driver is in the abnormal state in which the driver cannot perform normal driving due to loss of the physical condition, the electronic control unit is further configured to decelerate the vehicle by controlling the deceleration of the vehicle so as to reach a predetermined value or more.

2. The driving control device according to claim 1, wherein, in a case that the target deceleration of the vehicle when the driving support control is unable to be performed normally is greater than or equal to the predetermined value, the electronic control unit is configured to maintain the target deceleration of the vehicle when the driving support control is unable to be performed normally.

3. The driving control device according to claim 1, wherein the electronic control unit is configured to increase the target deceleration of the vehicle to the predetermined value or more in a case that the target deceleration of the vehicle when the driving support control is unable to be performed normally is less than the predetermined value.

4. The driving control device according to claim 1, wherein the electronic control unit is configured to maintain the increasing rate of change and increase the target deceleration of the vehicle until the target deceleration reaches an allowable deceleration set in advance in a case that (a) the target deceleration of the vehicle when the driving support control is unable to be performed normally is greater than or equal to the predetermined value, and (b) a rate of change in the target deceleration of the vehicle is an increasing rate of change.

5. The driving control device according to claim 1, wherein the electronic control unit is configured to maintain the increasing rate of change and increase the target deceleration of the vehicle until the target deceleration reaches the predetermined value or morein a case that (a) the target deceleration of the vehicle when the driving support control is unable to be performed normally is less than the predetermined value and (b) a rate of change in the target deceleration of the vehicle is an increasing rate of change.

6. The driving control device according to claim 1, wherein the electronic control unit is configured to decelerate the vehicle until the vehicle stops.

7. The driving control device according to claim 1, wherein, in the case that the electronic control unit determines that (a) the driving support control is unable to be performed normally because it is not possible to properly detect the target deceleration of the vehicle due to an abnormality in a detection device or in a signal transmission path from the detection device to a control device and (b) the driver is not in the abnormal state, the electronic control unit is configured (i) not to decelerate the vehicle automatically and (ii) to control an acceleration and the deceleration of the vehicle in accordance with an operation of the driver.

* * * * *